United States Patent
Chung et al.

(10) Patent No.: US 9,420,624 B2
(45) Date of Patent: Aug. 16, 2016

(54) TERMINAL NODE DEVICE AND WIRELESS SENSOR NETWORK SYSTEM USING THE TERMINAL NODE DEVICE

(71) Applicant: GANGNEUNG-WONJU NATIONAL UNIVERSITY INDUSTRIAL ACADEMY COOPERATION GROUP, Gangneung-si (KR)

(72) Inventors: Tae Yun Chung, Gangneung-si (KR); Lae-Jeong Park, Gangneung-si (KR); Han-Su Chung, Gangneung-si (KR); Sung-Wook Park, Seoul (KR); Jung-Ho Moon, Yongin-si (KR)

(73) Assignee: GANGNEUNG-WONGJU NATIONAL UNIVERSITY INDUSTRIAL ACADEMY COOPERATION GROUP (KR)

( * ) Notice: Subject to any disclaimer, the term of this patent is extended or adjusted under 35 U.S.C. 154(b) by 401 days.

(21) Appl. No.: 13/913,751

(22) Filed: Jun. 10, 2013

(65) Prior Publication Data

US 2013/0329719 A1   Dec. 12, 2013

(30) Foreign Application Priority Data

Jun. 11, 2012  (KR) .................... 10-2012-0062238

(51) Int. Cl.
*H04W 76/04* (2009.01)
*H04W 84/20* (2009.01)

(52) U.S. Cl.
CPC ............ *H04W 76/046* (2013.01); *H04W 84/20* (2013.01)

(58) Field of Classification Search
None
See application file for complete search history.

(56) References Cited

U.S. PATENT DOCUMENTS

| | | | | |
|---|---|---|---|---|
| 2003/0126253 A1* | 7/2003 | Ewing | ..................... | G06F 1/26 709/223 |
| 2009/0059827 A1* | 3/2009 | Liu | ..................... | H04W 76/048 370/311 |
| 2010/0061326 A1* | 3/2010 | Lee | ..................... | H04W 72/12 370/329 |
| 2010/0205596 A1* | 8/2010 | Chung | ................. | H04L 41/082 717/172 |
| 2012/0246261 A1* | 9/2012 | Roh | ..................... | G06F 15/16 709/217 |

FOREIGN PATENT DOCUMENTS

KR     1020080070966     8/2008

* cited by examiner

*Primary Examiner* — Brandon Renner
*Assistant Examiner* — Prince A Mensah
(74) *Attorney, Agent, or Firm* — Cantor Colburn LLP

(57) ABSTRACT

Provided is a terminal node device including: a communication module communicating with an external sink node device and another terminal node device; sensor modules; and a control unit allowing the terminal node device to be operated while allowing the terminal node device to transition into one of the initial, synchronous, and leave states. In the initial state, the control unit scans a received message; if a beacon message is received from a sink node device, the control unit transitions into the synchronous state; and if not for a predetermined time, the control unit transitions into the leave state. Accordingly, if a beacon message is received from the sink node device, the terminal node device transitions into the synchronous state to constitute a server-based wireless sensor network; and if not, the terminal node device transitions into the leave state to constitute an independent sensor network.

16 Claims, 10 Drawing Sheets

TERMINAL NODE DEVICE AND WIRELESS SENSOR NETWORK SYSTEM USING THE TERMINAL NODE DEVICE

CROSS-REFERENCE TO RELATED PATENT APPLICATION

This application claims the benefit of Korean Patent Application No. 10-2012-00062238, filed on Jun. 11, 2012, in the Korean Intellectual Property Office, the disclosure of which is incorporated herein in its entirety by reference.

BACKGROUND OF THE INVENTION

1. Field of the Invention

The present invention relates to a wireless sensor network system, and more particularly, to a terminal node device which is synchronized with a sink node device to constitute a server-based wireless sensor network or is not connected to a sink node device to constitute an independent sensor network and a wireless sensor network system which is configured so as to improve reliability and utilizability by using the terminal node device.

2. Description of the Related Art

A wireless sensor network technology is a core technology for implementing ubiquitous computing environments, where a large number of nodes may be connected in a wireless manner to be operated.

In the sensor network, since each node is operated with a battery having a limited capacity, measured data need to be transmitted by using minimum energy. In addition, in order to adapt the sensor network to a real-time application system, transmission delay in a large-scale sensor network needs to be minimized. Therefore, in a sensor network which needs to be monitored at real time, a protocol which minimizes consumption of a battery and has small network transmission delay is required.

Due to these requirements, inventors of the present invention filed Korean Patent Publication No. 10-2008-0070966, titled "Wireless Sensor Network Having a Linear Structure capable of performing Bidirectional Data Communication and a Method thereof" in the Korean Intellectual Property Office The above-mentioned application discloses a technique of a wireless sensor network which is configured with a plurality of nodes, wherein each node is connected to one upper node and one lower node so that nodes from a sink node to a terminal node are linearly connected, wherein each node includes an active duration for communicating data with the upper node and the lower node, wherein the active duration includes a downlink active duration for transmitting data/command from the sink node to the terminal node and an uplink active duration for transmitting data/command from the terminal node to the sink node to implement bidirectional communication between the sink and terminal nodes in one period of the active duration.

Since the above-described wireless sensor network is configured as a time-synchronization-based linear network, the sink node is necessarily installed. Therefore, in the case where the sink node is in disorder, there is a problem in that the whole wireless sensor network cannot be operated. Therefore, there is a problem in that the sink node needs to be controlled for continuous network maintenance.

On the other hand, wireless sensor networks have been widely commercialized so as to detect a forest fire, a symptom of bridge breakage, a damage of cultural assets and to be used for intelligent buildings or small-sized buildings. Therefore, in order to solve the above-described problems, development of techniques for improving utilizability of the wireless sensor network is required.

SUMMARY OF THE INVENTION

The present invention is also to provide a terminal node device which can constitute a server-based sensor network or an independent sensor network according to whether or not to receive a beacon message from a sink node device.

In addition, the present invention is also to provide a wireless sensor network system and a terminal node device, wherein terminal node devices constituting the wireless sensor network system constitute a server-based network to allow a sensing message to be communicated and constitute a network without a server to allow a sensing message such as an emergency alarm message to be communicated, so that utilizability of the wireless sensor network system can be improved.

In addition, the present invention is also to provide a wireless sensor network system and a terminal node device, wherein a plurality of terminal node devices are allowed to communicate with each other through one transmitting direction, so that structural change of a sensor network system such as addition or removal of the terminal node device in the already-formed sensor network system can be easily performed.

According to a first aspect of the present invention, there is provided a terminal node device communicatable with an external sink node device and another terminal node device, including: a communication module which communicates with the external sink node device and another terminal node device; sensor modules; and a control unit which controls the terminal node device so as to transition from an initial state into one of a synchronous state and a leave state and allows the terminal node device to be operated while transitioning into one of the initial state, the synchronous state, and the leave state, wherein in the case of the initial state, the control unit scans a message received from an external portion by using the communication module; if a beacon message is received from a sink node device, the control unit transitions into the synchronous state; and if a beacon message is not received from the sink node device for a predetermined time, the control unit transitions into the leave state, wherein in the case of the synchronous state, if a beacon message is received from the sink node device by using the communication module, the control unit synchronizes the terminal node device with the sink node device according to the beacon message received from the sink node device, performs sensing by using the sensor module, generates a sensing message including the sensed information, and transmits the sensing message to the sink node device by using the communication module; and if a beacon message is not received from the sink node device for a predetermined time, the control unit transitions into the leave state, and wherein in the case of the leave state, the control unit performs sensing by using the sensor module and broadcasts a sensing message including the sensed information; and if the leave state is maintained for a preset time, the control unit transitions into the initial state.

In the terminal node device according to the first aspect, preferably, in the case of the synchronous state, the control unit allows one frame duration for message communication to include a receiving duration, a transmitting duration, a sensing duration, and a sleep duration, wherein the receiving duration is a duration where a beacon message is received from the sink node device, the transmitting duration is a duration where a sensing message is transmitted to the sink node device, the sensing duration is a duration where sensing is performed by using the sensor module, and the sleep duration is a duration excluding the receiving duration, the transmitting duration, and the sensing duration, and wherein the control unit allows the terminal node device and the sink node device to be synchronized in time with each other according to the beacon message received from the sink node device so that the receiving duration is set to correspond to the transmitting duration of the sink node device and the transmitting duration is set to correspond to the receiving duration of the sink node device.

In the terminal node device according to the first aspect, preferably, the terminal node device further includes an internal memory, wherein in the case of the synchronous state or the leave state, the control unit performs sensing by using one or two or more among the sensor modules and stores sensing data including sensed information in the internal memory, and wherein the sensed information includes a type of the sensor and a sensing value.

In the terminal node device according to the first aspect, preferably, the terminal node device further includes an output unit which outputs emergency alarm, wherein in the case of the synchronous state or the leave state, if a sensing value of the sensing message exceeds a preset limit range of the sensor module, the control unit outputs the emergency alarm though the output unit and, at the same time, generates an emergency alarm message to broadcast the emergency alarm message, and wherein if the emergency alarm message is received through the communication module, the control unit outputs emergency alarm through the output unit.

In the terminal node device according to the first aspect, preferably, the terminal node device further includes a plurality of power supply outlets which receive commercial power as an input and outputs the commercial power, wherein the sensor modules includes at least one or more of a CO sensor, a temperature sensor, a smoke sensor, an overcurrent sensor for the power supply outlet, a power detection unit for the power supply outlet, and a voltage detection unit for the power supply outlet.

According to a second aspect of the present invention, there is provided a wireless sensor network system including: a sink node device; and a plurality of terminal node devices, wherein the sink node device transmits a beacon message to the terminal node devices, wherein each of the terminal node devices includes: a communication module which communicates with the external sink node device and another terminal node device; sensor modules; and a control unit which controls the terminal node device so as to transition from an initial state into one of a synchronous state and a leave state and allows the terminal node device to be operated while transitioning into one of the initial state, the synchronous state, and the leave state, wherein in the case of the initial state, the control unit scans a message received from an external portion by using the communication module; if a beacon message is received from a sink node device, the control unit transitions into the synchronous state; and if a beacon message is not received from the sink node device for a predetermined time, the control unit transitions into the leave state, wherein in the case of the synchronous state, if a beacon message is received from the sink node device by using the communication module, the control unit synchronizes the terminal node device with the sink node device according to the beacon message received from the sink node device, performs sensing by using the sensor module, generates a sensing message including the sensed information, and transmits the sensing message to the sink node device by using the communication module; and if a beacon message is not received from the sink node device for a predetermined time, the control unit transitions into the leave state, and wherein in the case of the leave state, the control unit performs sensing by using the sensor module and broadcasts a sensing message including the sensed information; and if the leave state is maintained for a preset time, the control unit transitions into the initial state.

According to the present invention, there is an advantage in that, if a beacon message is received from a sink node device, terminal node devices constituting a wireless sensor network system constitute a server-based network to allow a sensing message to be communicated and constitute a network without a server to allow a sensing message such as an emergency alarm message to be communicated with other terminal node devices, so that utilizability of the wireless sensor network system can be improved.

In addition, according to the present invention, there is an advantage in that a plurality of terminal node devices are allowed to communicate with each other through one transmitting direction, so that structural change of the sensor network system such as addition or removal of the terminal node device in the already-formed sensor network system can be easily performed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A terminal node device according to the present invention is characterized in that the terminal node device is operated in one of an initial state, a synchronous state, and a leave state according to whether or not to receive a beacon message from a sink node device. In the case where the terminal node device is in the synchronous state, the terminal node device is synchronized with the sink node device connected to a server to constitute a server-based wireless sensor network. On the other hand, in the case where the terminal node device is in the leave state, the terminal node device is not connected to a sink node device and a server to constitute an independent sensor network.

In this manner, according to the present invention, terminal node devices constituting the wireless sensor network system constitute a server-based network according to situations to allow a sensing message to be communicated and constitute a network without a server to allow a sensing message such as an emergency alarm message to be communicated, so that utilizability of the wireless sensor network system can be improved.

In addition, according to the present invention, a plurality of terminal node devices are allowed to communicate with each other through one transmitting direction, so that structural change of the sensor network system such as addition or removal of the terminal node device in the already-formed sensor network system can be easily performed.

Configurations and operations of the terminal node device according to the present invention and the wireless sensor network system using the terminal node device will be described in detail with reference to the drawings.

<Overall Configuration of Wireless Sensor Network System>

Figure 1:
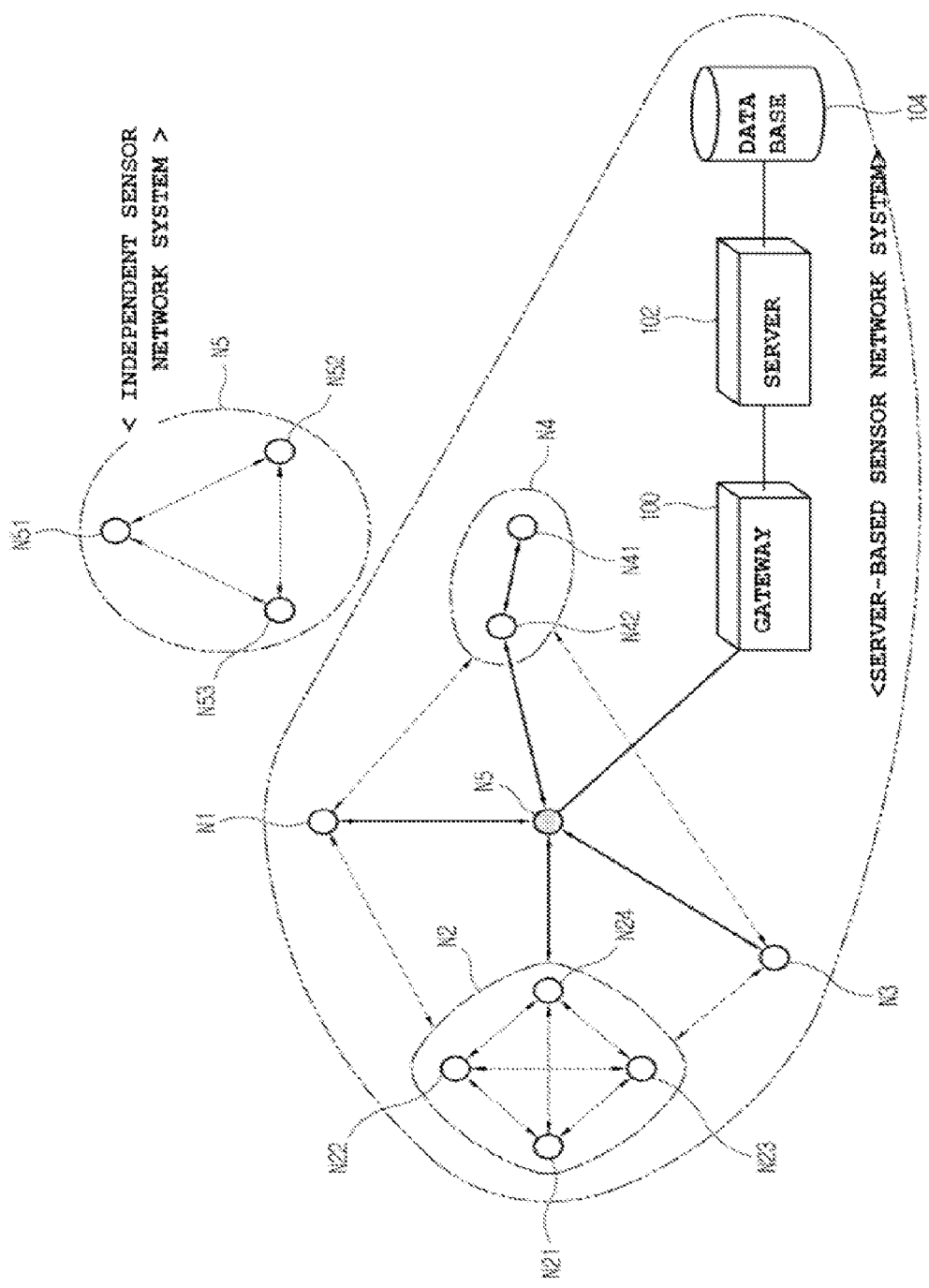
FIG. 1 is a diagram illustrating an overall configuration of a wireless sensor network system according to an exemplary embodiment of the present invention.

First, a configuration of a wireless sensor network system according to an exemplary embodiment of the present invention will be described with reference to FIG. 1.

The wireless sensor network system is configured to include a plurality of terminal node devices and a sink node device. The wireless sensor network system may be configured as a server-based sensor network system or an independent sensor network system according to a state of the sink node device.

The sink node device according to the present invention generates a beacon message and transmits the beacon message to the terminal node devices or communicate messages with a server through a gateway.

The terminal node device according to the present invention is operated while transitioning into one of an initial state, a synchronous state, and a leave state. In the initial state, the terminal node device scans reception of the beacon message of the sink node device. If the beacon message is received, the terminal node device transitions into the synchronous state. If the beacon message is not received for a predetermined time, the terminal node device transitions into the leave state. In the synchronous state, the terminal node device is synchronized with the sink node device to communicate data with the sink node device, so that the terminal node device constitutes a server-based sensor network. In the leave state, the terminal node device is not connected to a sever to constitute an independent sensor network including only the terminal node devices. The terminal node device broadcasts a sensing message to other terminal node devices in the surroundings, and if the leave state is maintained for a predetermined time or more, the terminal node device transitions into the initial state.

Hereinafter, configurations and operations of the sink node device and the terminal node device and configurations and operations of the server-based sensor network and the independent sensor network constructed by using the terminal node devices and the sink node device will be described.

<Server-Based Sensor Network System>

The server-based network system is configured to include a sink node device NS, terminal node devices N1 to N4, a gateway 100, a server 102, and a database 104.

The sink node device NS transmits a beacon message for time synchronization of the terminal node devices N1 to N4 in the preset transmitting duration. The beacon message may include an emergency alarm message which the sink node device NS is to transmit to the terminal node devices N1 to N4 in the surroundings or a control message which the sink node device NS receives from the server 102.

Next, the sink node device NS receives and processes sensing messages which the terminal node devices N1 to N4 in a preset receiving duration, returns an ACK message, uploads the received sensing messages to the server 102 through the gateway 100, and receives an ACK message from the gateway 100. Herein, if the sensing message includes an emergency alarm message, the sink node device NS outputs emergency alarm.

In addition, the sink node device NS uploads a sensing message generated in a preset receiving duration by the sink node device to the server 102 through the gateway 100 and receives an ACK message from the gateway 100. In addition, in the receiving duration, the sink node device NS first returns an ACK message corresponding to the arrived sensing message.

In addition, in the preset sensing duration, the sink node device NS senses information on the surrounding environments and the like by using the sensor modules built in the sink node device and stores sensing data including the sensed information in the internal memory. The sensed information includes types of sensors and sensing values sensed by the sensors. The sink node device NS generates a sensing message including the sensing data and uploads the sensing message to the server 102.

The terminal node devices receive a beacon message from the sink node device to maintain the synchronous state.

Each of the terminal node devices N1 to N4 are configured as one or more terminal node devices. In the preset receiving duration, each terminal node device receives and processes a beacon message from the sink node device NS and performs time synchronization. In addition, if the beacon message includes an emergency alarm message, the terminal node devices N1 to N4 output alarm. In addition, if the beacon message includes a control message, the terminal node devices N1 to N4 perform operations according to the control message.

Next, in the transmitting duration allocated to each of the terminal node devices N1 to N4, each of the terminal node devices N1 to N4 transmits the sensing message generated by each of the terminal node devices N1 to N4 to the sink node device NS and receives an ACK message. Herein, the sensing message may include an emergency alarm message or the like.

In addition, a plurality of the terminal node device constitute one terminal node device group, and one transmitting duration may be allocated to some terminal node devices N2 and N4 among the terminal node devices N1 to N4. In this case, the terminal node device which acquires priority among a plurality of the terminal node devices included in one group transmits a sensing message to the sink node device in the allocated transmitting duration. It is preferable that a plurality of the terminal node devices included in one group acquires priority through priority competition according to priority of the to-be-transmitted sensing message and node address information. Herein, the node address information is indicated by a number such as a serial number.

In addition, in the sensing duration, the terminal node devices N1 to N4 senses information on the surrounding environments or the like by using the sensor modules built in the terminal node devices themselves and store sensing data including types of sensors and sensing values in the internal memories. Particularly, in the case where a plurality of terminal node devices constitute one terminal node device group and one transmitting duration is allocated to some terminal node devices N2 and N4 among the terminal node devices N1 to N4, the sensing data are allocated with priority according to the types of the sensors and the magnitudes of the sensing values and stored in the internal memories. For example, in the case where the sensor is a fire sensing related sensor, highest priority may be allocated; and in the case where the sensor is a monoxide sensor, priority lower than the priority of the fire sensing related sensor may be allocated.

Next, in the remaining durations excluding the receiving duration, the transmitting duration, and the sensing duration, the terminal node devices N1 to N4 maintain the sleep state so as to minimize necessary power consumption.

Figure 2:
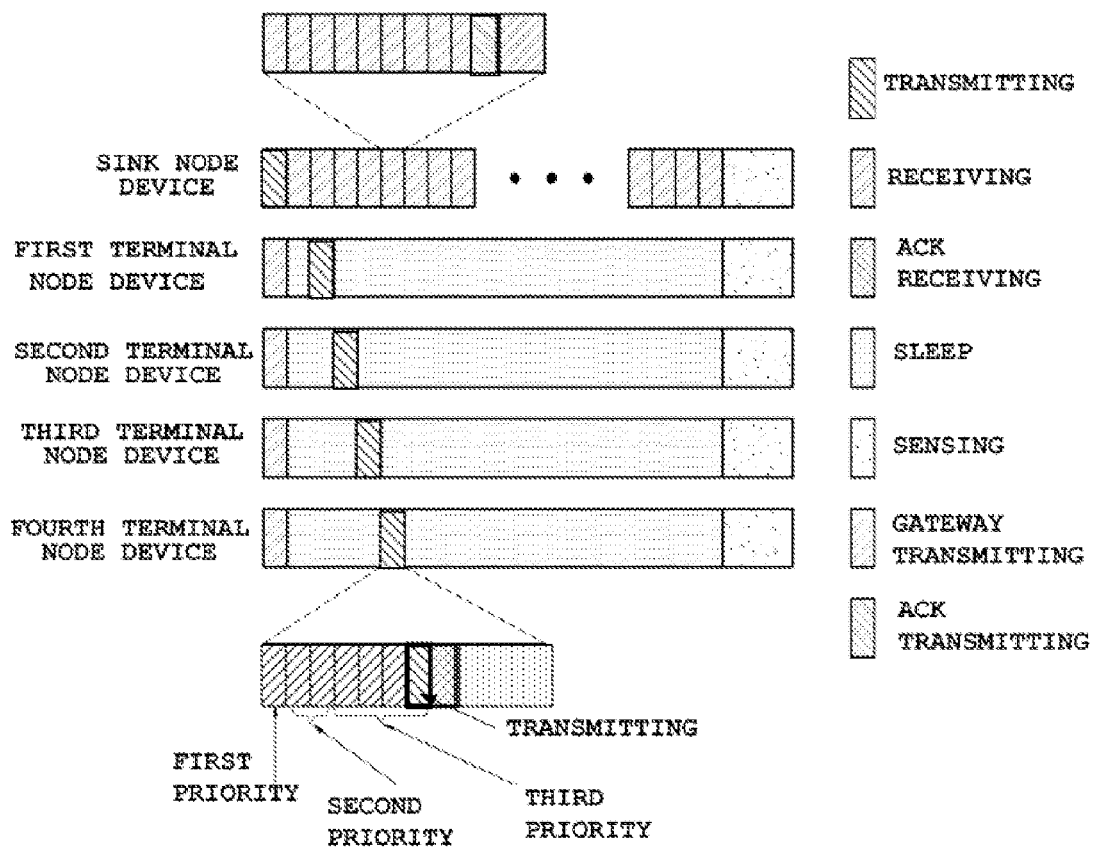
FIGS. 2, 4, and 7 are diagrams illustrating a timing structure according to an exemplary embodiment of the present invention.

A timing structure of one frame for message communication in the sink node device and the terminal node device in the synchronous state constituting the above-described server-based sensor network will be described with reference to FIG. 2.

The one frame of the sink node device NS is configured to include a transmitting duration, a plurality of receiving durations, and a sensing duration. In the frame, the transmitting duration where a beacon message is transmitted is located at the start position; the sensing duration where the sensors performs sensing is located at the end position; and the receiving durations where messages are received from the terminal node devices are located between the transmitting duration and the sensing duration. Each of the receiving durations is allocated to each of the terminal node devices N1 to N4.

Each of the receiving durations is configured to be divided into a plurality of time slots. Namely, the receiving durations are divided into a sensing message receiving duration where sensing messages are received from the terminal node devices N1 to N4, an ACK transmitting duration where an ACK message is transmitted, and a gateway transmitting duration where the received sensing message is transmitted to the gateway 100. In addition, in any one of the receiving durations, the sink node device NS generates a sensing message including sensing date of the sink node device NS itself and transmits the sensing message to the gateway 100.

The one frame of each of the terminal node devices N1 to N4 in the synchronous state is configured to include a receiving duration, a transmitting duration, a sensing duration, and a sleep duration. In the frame of the terminal node device in the synchronous state, the receiving duration where a beacon message is received is located at the start position; the sensing duration where the sensors perform sensing is located at the end position; the transmitting duration is located at a position corresponding to any one of the receiving durations of the sink node device NS between the receiving duration and the sensing duration; and the sleep duration is located in the remaining durations.

Particularly, in order to consider the case where a plurality of the terminal node devices constitute one terminal node device group and one transmitting duration is allocated to a plurality of the terminal node devices, the transmitting duration is configured to be divided into a plurality of time slots, which include a plurality of time slots for message transmission and a time slot for ACK signal reception.

With respect to a plurality of the time slots for message transmission, one or more time slots may be allocated mainly according to priority allocated to the sensing message, and the number of time slots allocated to each priority may be different according to the node address information.

For example, one time slot is allocated to first priority, and two time slots are allocated to second priority. This is because, since a sensing message with the first priority rarely occurs, it is determined that there is no priority contention, so that one time slot is allocated to the first priority. Among the two time slots allocated to the second priority, a first time slot corresponds to odd-numbered node address information, and a second time slot corresponds to even-numbered node address information. Namely, where there are two terminal node devices having sensing data with the second priority, the terminal node device with the odd-numbered node address among the terminal node devices first transmits the sensing data thereof to the sink node device by using the first time slot. Next, since the terminal node device with the even-numbered node address uses the second time slot, the sink node device treats only the sensing message transmitted through the first time slot as a valid message, so that the terminal node device cannot receive an ACK message indicating normal reception and transmission fails. In addition, four time slots may be allocated to third priority, and the four time slots correspond to four node addresses. Namely, the terminal node device with the lowest-numbered node address may transmit a sensing message to the sink node device by using a first time slot of the third priority, and the terminal node device with the next node address may transmit a sensing message to the sink node device by using a second time slot of the third priority.

On the other hand, one or more time slots allocated to the above-described priority may also be determined at random.

The gateway 100 receives the sensing message from the sink node device NS and transmits the sensing message to the server 102.

The server 102 stores the sensing message transmitted from the gateway 100 in the database 104. The server 102 informs a manager or a user of the sensing message stored in the database 104 through a manager's terminal or a user's terminal connected via a web or the like. In addition, the server 102 generates a control message according to control request through the manager's terminal or the user's terminal and transmits the control message to the sink node device NS through the gateway 100. In this case, in the transmitting duration, the sink node device NS may transmit the control message to the terminal node device.

<Independent Sensor Network>

In the case where the terminal node device does not receive a beacon message from the sink node device, the terminal node device transitions into the leave state, so that an independent sensor network is construed with only the terminal node devices. Therefore, the independent sensor network N5 is configured to include terminal node devices N51 to N53 in the leave state.

If a preset sensing duration arrives, a plurality of the terminal node devices N51 to N53 in the leave state constituting the independent sensor network sense information on the surrounding environments or the like through internal sensor modules, broadcast an emergency alarm message to the terminal node devices in the surroundings according to the sensing result, and output emergency alarm. Herein, by taking into consideration that time synchronization may not be made between a plurality of the terminal node devices N51 to N53, it is preferable that the emergency alarm message is repeatedly transmitted for a time determined by one communication cycle which is determined in advance.

In addition, in the durations excluding the sensing duration, each of the terminal node devices N51 to N53 maintains the sleep state, and if the count value of the leave state exceeds a limit value, each of the terminal node devices transitions into the initial state.

Configurations and operations of the above-described sink node device and terminal node device according to the present invention will be described more in detail.

<Configurations of Sink Node Device and Terminal Node Device>

The sink node device and the terminal node device according to the present invention can be adapted to various sensing apparatuses which sense surrounding environments by using built-in sensor modules. However, for the convenience of description, in the embodiments of the present invention, only a multi-tap device adapted to an apparatus for detecting fire, current leakage, disconnection, power consumption, and the like is exemplified. The multi-tap device has a plurality of power supply outlets which receive commercial power as an input and output the commercial power through the outlets.

Figure 3:
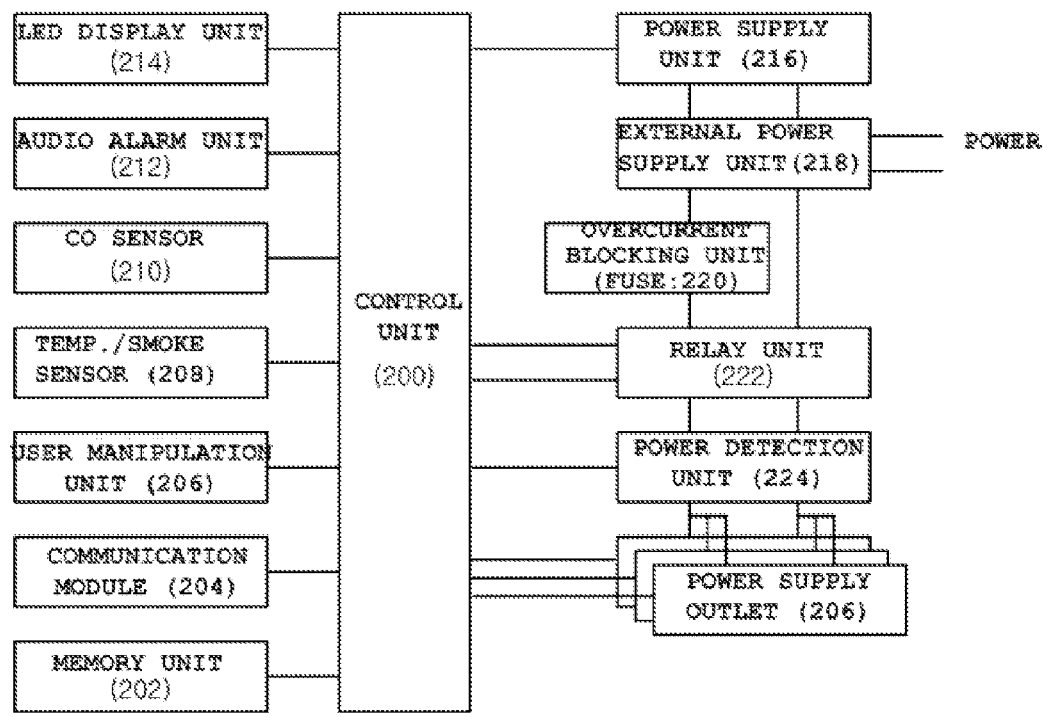
FIG. 3 is a diagram illustrating a configuration of a terminal node device according to an exemplary embodiment of the present invention.

The sink node device and the terminal node device included in the wireless sensor network system according to the present invention are the same in terms of basic hardware configuration. However, the sink node device and the terminal node device are different from each other in terms of operation processes of the control unit. Hereinafter, configurations and operations of the sink node device and the terminal node device will be described in detail with reference to FIG. 3.

The terminal node device is configuration to include a control unit 200, a memory unit 202, a communication module 204, a user manipulation unit 206, a temperature/smoke sensor 208, a CO sensor 210, an audio alarm unit 212, an LED display unit 214, a power supply unit 216, an external power supply unit 218, an overcurrent blocking unit 220, a relay unit 222, a power detection unit 224, and a power supply outlet 226.

The control unit of the sink node device performs processes for performing functions of the sink node device, and the control unit of the terminal node device performs processes for performing functions of the terminal node device.

The memory unit 202 stores various types of information including a process program of the control unit 200. Particularly, the memory unit 202 stores node address information of the terminal node devices, sensing period information of the temperature/smoke sensor 208, the CO sensor 210, power detection unit 224, and the like, setting information of the sink node device or terminal node device, and the like. In addition, the memory unit 202 includes a storage area for storing sensing data and priority information thereof.

The communication module 204 is used for communication to the control unit 200 or communication to other terminal node devices or the gateway 100.

The user manipulation unit 206 receives various commands or data as an input from a user and supplies the commands or data to the control unit 200.

Under the control of the control unit 200, the temperature/smoke sensor 208 senses ambient temperature and existence of preset gas and supplies the sensing result to the control unit 200. Herein, the sensing information of the temperature/smoke sensor 208 is utilized as fire detection information.

Under the control of the control unit 200, the CO sensor 210 senses monoxide (CO) and supplies the sensing result to the control unit 200.

Under the control of the control unit 200, the audio alarm unit 212 receives an audio alarm signal and outputs the audio alarm signal so as to perform audio alarm.

Under the control of the control unit 200, the LED display unit 214 drives an LED according to LED display information to display predetermined information. By using the information displayed through the LED display unit 214, it may be informed whether the apparatus is operated as a terminal node device or a sink node device; it may be informed that the apparatus is in an alarm state; or an operating state such as a sensing operation, a message transmitting operation, or a message receiving operation may be informed.

The power supply unit 216 converts commercial power input through the external power supply unit 218 into internal driving power and supplies the internal driving power to components of the terminal node device.

In addition, the external power supply unit 218 receives external commercial power and supplies the external commercial power to the power supply unit 216 and the power supply outlets 226.

An overcurrent blocking unit 220 which blocks a power supply line according to occurrence of overcurrent, a relay unit 222 which blocks the power supply line under the control of the control unit 200, and a power detection unit 224 which detects power supplied through the power supply line and supplies the detection result to the control unit 200 are installed between the external power supply unit 218 and the power supply outlets 226.

The power supply outlets 226 further has a function of detecting voltages output to the power supply outlets and supplying the detected voltages to the control unit 200. This function can be used to check a standby voltage or a use voltage.

The control unit 200 of the terminal node device sets a role as a sink node device or a terminal node device according to external commands through the user manipulation unit 206 or the communication module 204 and controls operations of the components. Hereinafter, operations of the control units of the sink node device and the terminal node device will be described in detail.

<Sink Node Device>

Hereinafter, the operations of the control unit of the sink node device will be described in detail.

Figure 4:
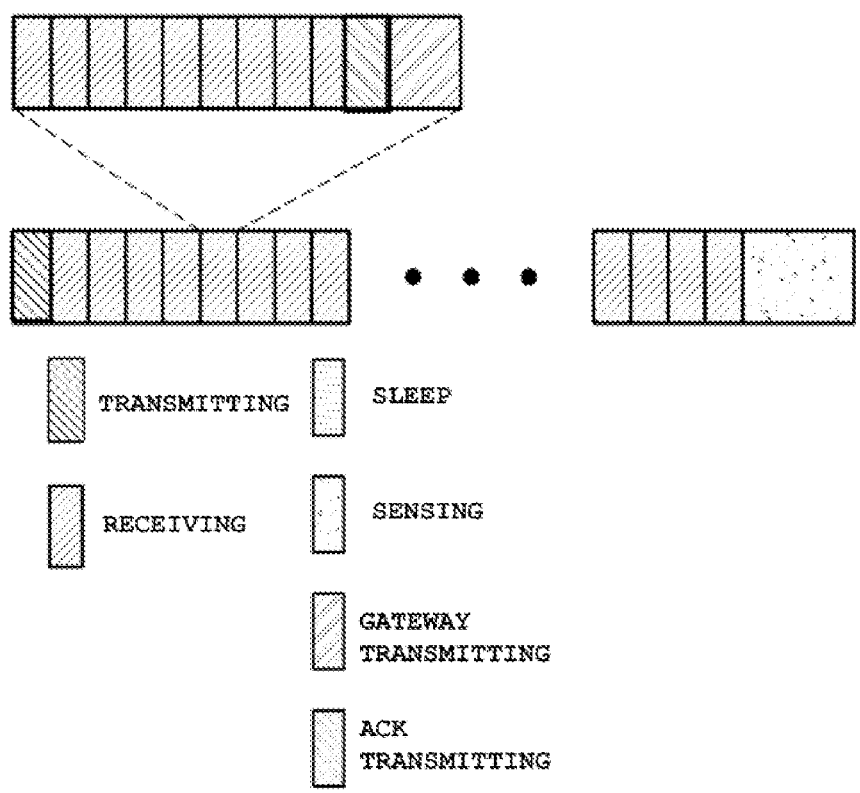

As illustrated in FIG. 4, the sink node device includes a transmitting duration, a plurality of receiving durations, and a sensing duration in one frame for message communication. Hereinafter, operations in each duration will be described.

In the transmitting duration, the sink node device broadcasts a beacon message to terminal node devices located in the surroundings.

Each of the receiving durations is allocated to each of the terminal node devices in the surroundings. In the receiving durations allocated corresponding to the terminal node devices, when the sink node device receives a sensing message from the terminal node device, the sink node device returns an ACK message and supplies the sensing message to the server 102 through the gateway 100.

In addition, in the receiving duration allocated to the sink node device itself among the receiving durations, the sink node device generates a sensing message by using sensing data including a sensing value stored in the internal memory unit of the sink node device itself and supplies the sensing message to the server 102 through the gateway 100.

In addition, in the sensing duration, the sink node device senses surrounding situations or the like through sensor modules built in the sink node device itself and stores sensed sensing information and sensing data including sensing values to the internal memory.

Figure 5:
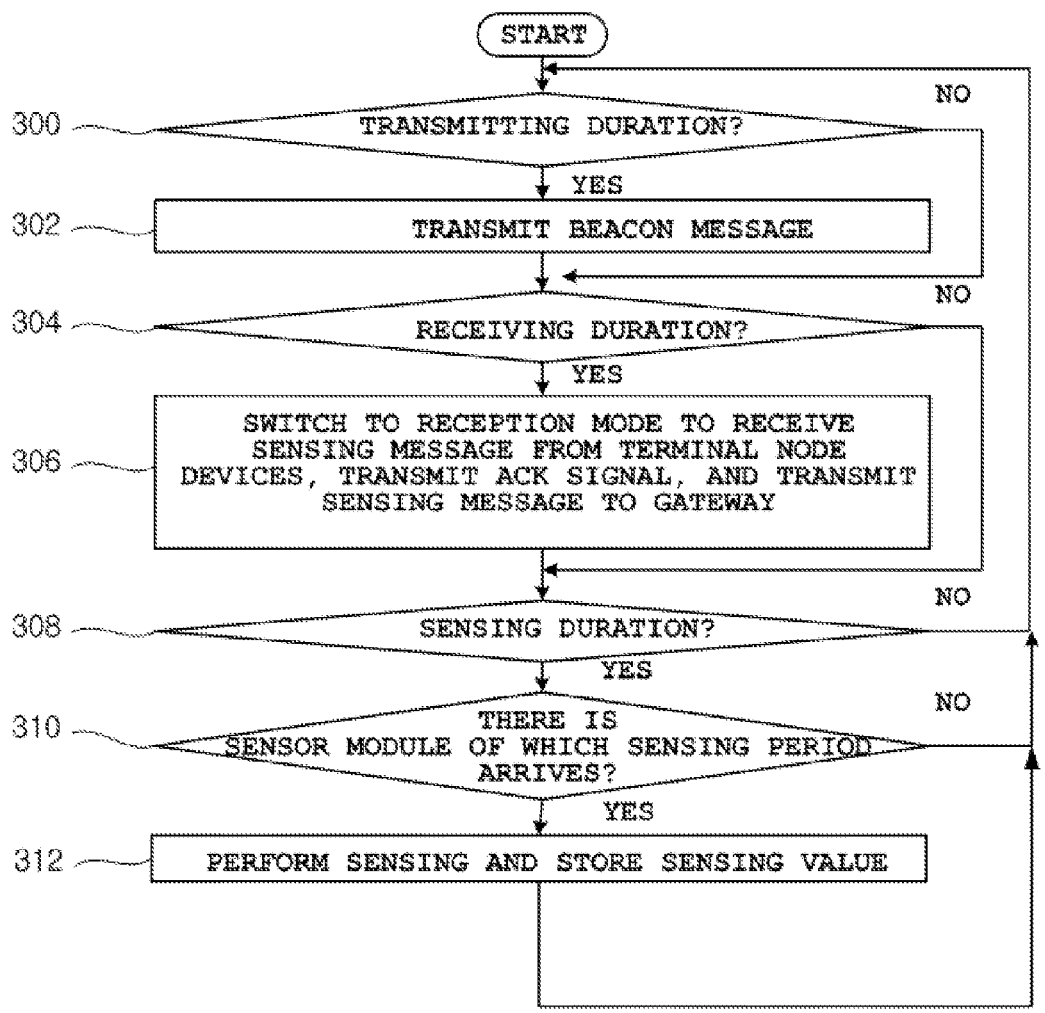
FIGS. 5, 6, and 8 to 10 are diagrams illustrating a process procedure of a terminal node device according to an exemplary embodiment of the present invention.

Operations of the sink node device will be described with reference to a flowchart of FIG. 5.

The sink node device checks whether a preset transmitting duration arrives (Step 300).

If the transmitting duration arrives, the sink node device broadcasts and transmits the beacon message to the terminal node devices in the surroundings (Step 302). Herein, the beacon message may include an emergency alarm message generated by the sink node device, an emergency alarm message which the sink node device receives another terminal node device, and a control message which the server 102 supplies through the gateway 100. In addition, when the emergency alarm message is transmitted, the sink node device outputs the emergency alarm.

Next, the sink node device checks whether or not any one of preset receiving durations arrives (Step 304).

If any one of the receiving durations arrives, the sink node device receives a sensing message which any one terminal node device transmits, returns an ACK message to the terminal node device which transmits a normally-received sensing message, and transmits the received sensing message to the gateway 100. Particularly, the sink node device processes the sensing message which the terminal node device transmits and, if the sensing message is an emergency alarm message, the sink node device outputs emergency alarm.

On the other hand, if the receiving duration is a duration allocated to the sink node device itself, the sink node device generates a sensing message including sensing data stored in the internal memory of the sink node device itself and transmits the sensing message to the gateway 100 (Step 306).

In addition, the sink node device checks whether or not a preset sensing duration arrives (Step 308).

If the sensing duration arrives, the control unit of the sink node device checks whether or not there is a sensor module of which sensing period arrives (Step 310). Since the sensing period is different according to a type of the sensor module, every time when the sensing duration arrives, sensing periods of a plurality of the sensor modules are checked, and sensing is performed with respect to the sensor module of which sensing period arrives. Particularly, the sensing period may be defined as a multiple number of a period of a sensing duration.

If there is a sensor module of which sensing period arrives, the sink node device performs sensing by using the sensor module of which sensing period arrives and stores sensing data including the obtained sensing value in the internal memory (Step 312). Particularly, emergency alarm message setting information and the like are additionally stored according to a type or size of the sensing value.

<Terminal Node Device>

Hereinafter, operations of the control unit of the terminal node device will be described in detail.

Figure 6:
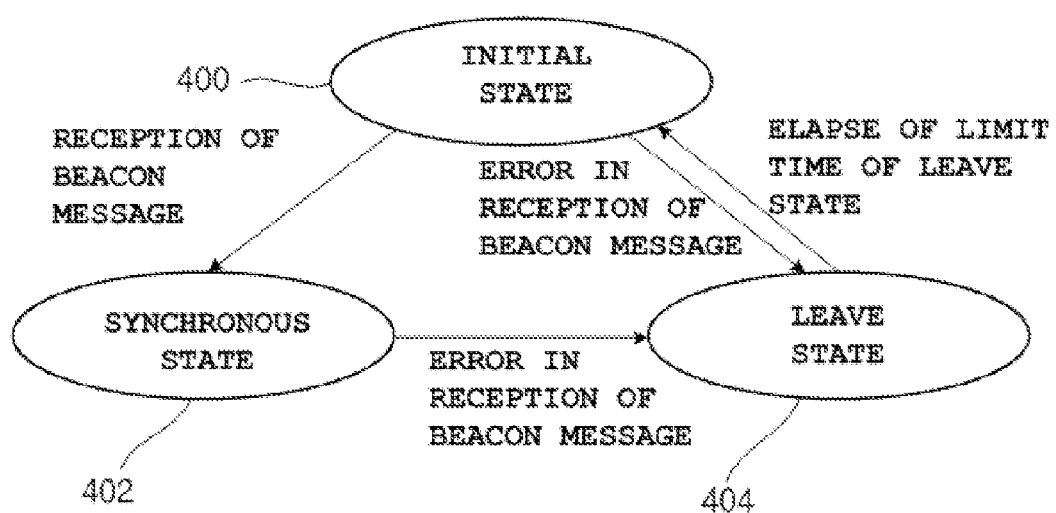

The terminal node device is operated while transitioning into one of an initial state, a synchronous state, and a leave state. Referring to FIG. 6, in the initial state 400, the terminal node device scans reception of the beacon message. During the scan, if the beacon message is received, the terminal node device determines that a server-based sensor network system is constructed and transitions into the synchronous state 402. If the beacon message is not received, the terminal node device determines that an independent sensor network system is constructed and transitions into the leave state 404. In addition, in the synchronous state 402, if the beacon message is not received preset number of times or more, the terminal node device transitions into the leave state 404. In addition, in the leave state 404, if a preset leave state limit time elapses, the terminal node device transitions into the initial state 400 to attempt time synchronization.

Figure 7:
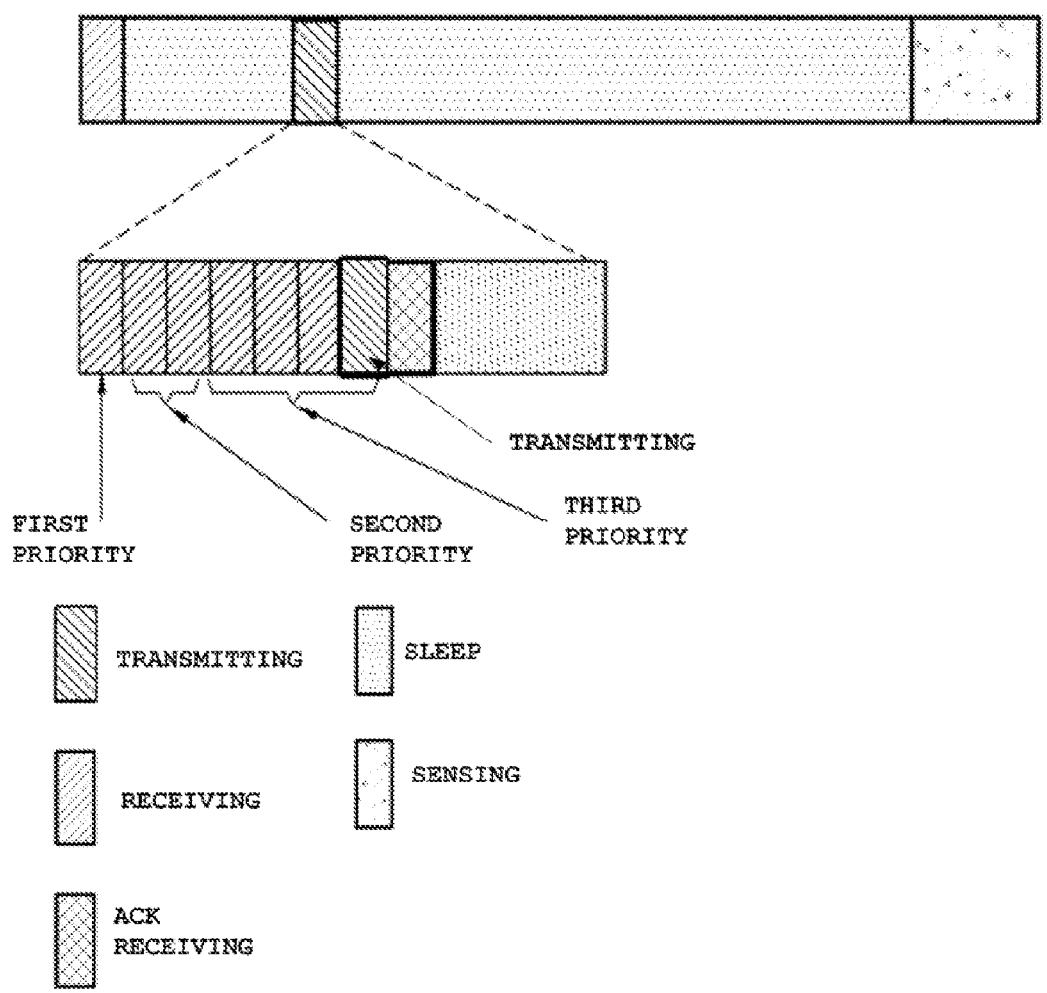

As illustrated in FIG. 7, in the synchronous state 402, the terminal node device receives the beacon message every preset receiving duration to perform the time synchronization, transmits the sensing message every preset transmitting duration, performs the sensing every preset sensing duration, and maintains a sleep state during first and second sleep durations as other durations. The first sleep duration is a duration between the receiving duration and the transmitting duration, and the second sleep duration is a duration between the transmitting duration and the sensing duration.

In addition, in the case where a single transmitting duration is allocated to one terminal node device group including a plurality of terminal node devices, in the synchronous state 402, a plurality of the terminal node devices constituting the group transmits a sensing message to the sink node device through priority competition.

For example, if a time slot corresponding to a priority level allocated to the sensing data and node address information stored in the internal memory unit of the terminal node device itself as illustrated in FIG. 7 is a seventh time slot, the terminal node device is switched to a transmission mode until the seventh time slot arrives, so that the terminal node device receives a preemptive message of a terminal node device in the surroundings, that is, a sensing message of the terminal node device. If the time slot of the terminal node device itself arrives, the terminal node device checks whether or not the preemptive message is received. If the preemptive message is not received before the time slot of the terminal node device itself, the terminal node device transmits the sensing message thereof to the sink node device. Herein, the sensing message serves as a preemptive message for remaining terminal node devices.

Figure 8:
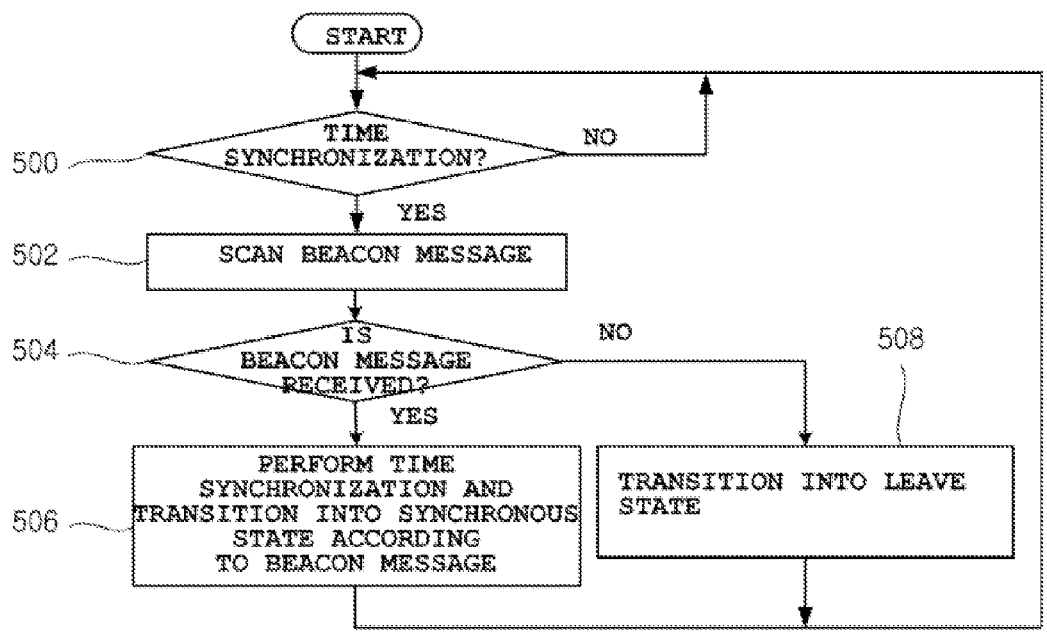
Figure 9:
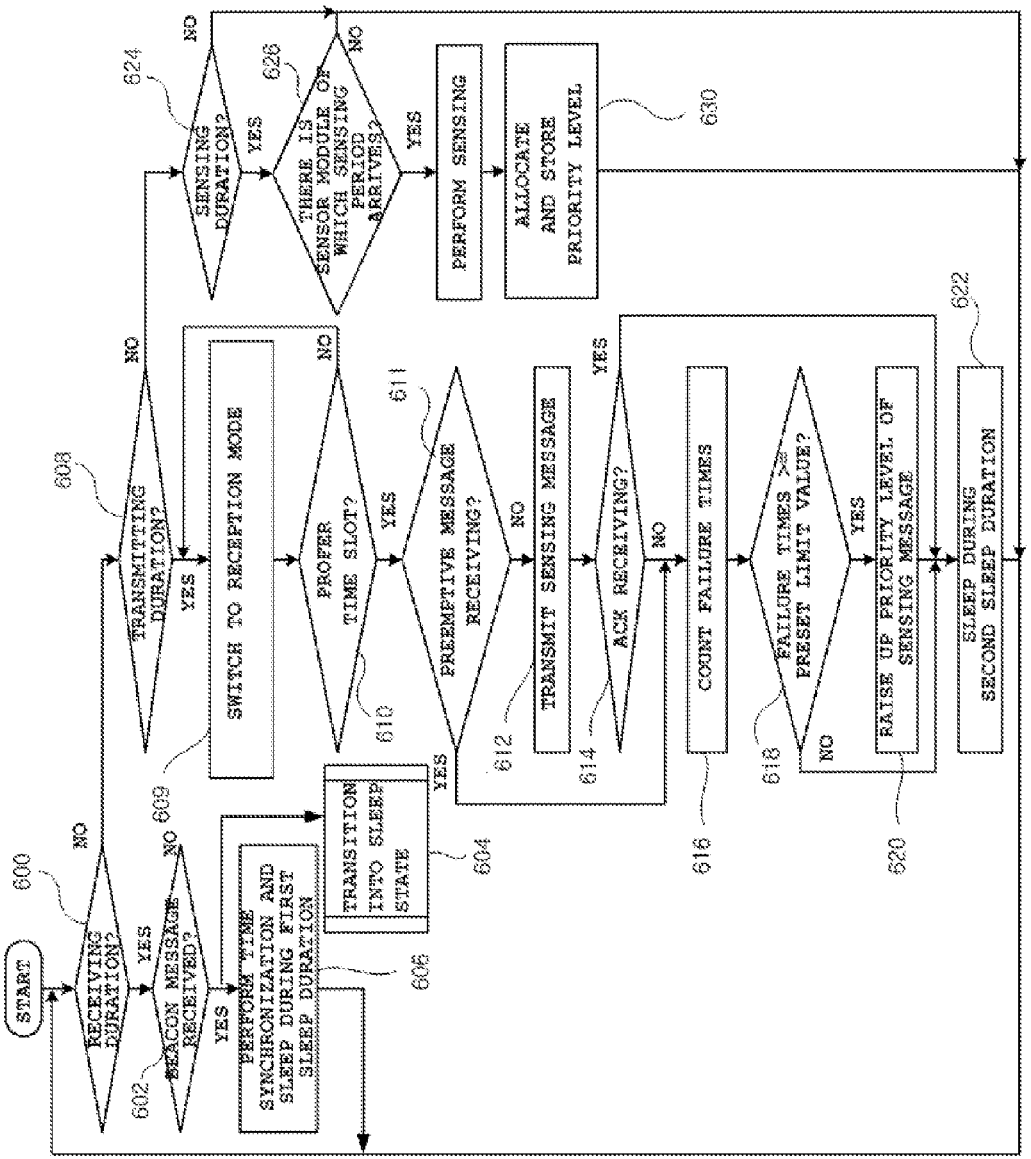
Figure 10:
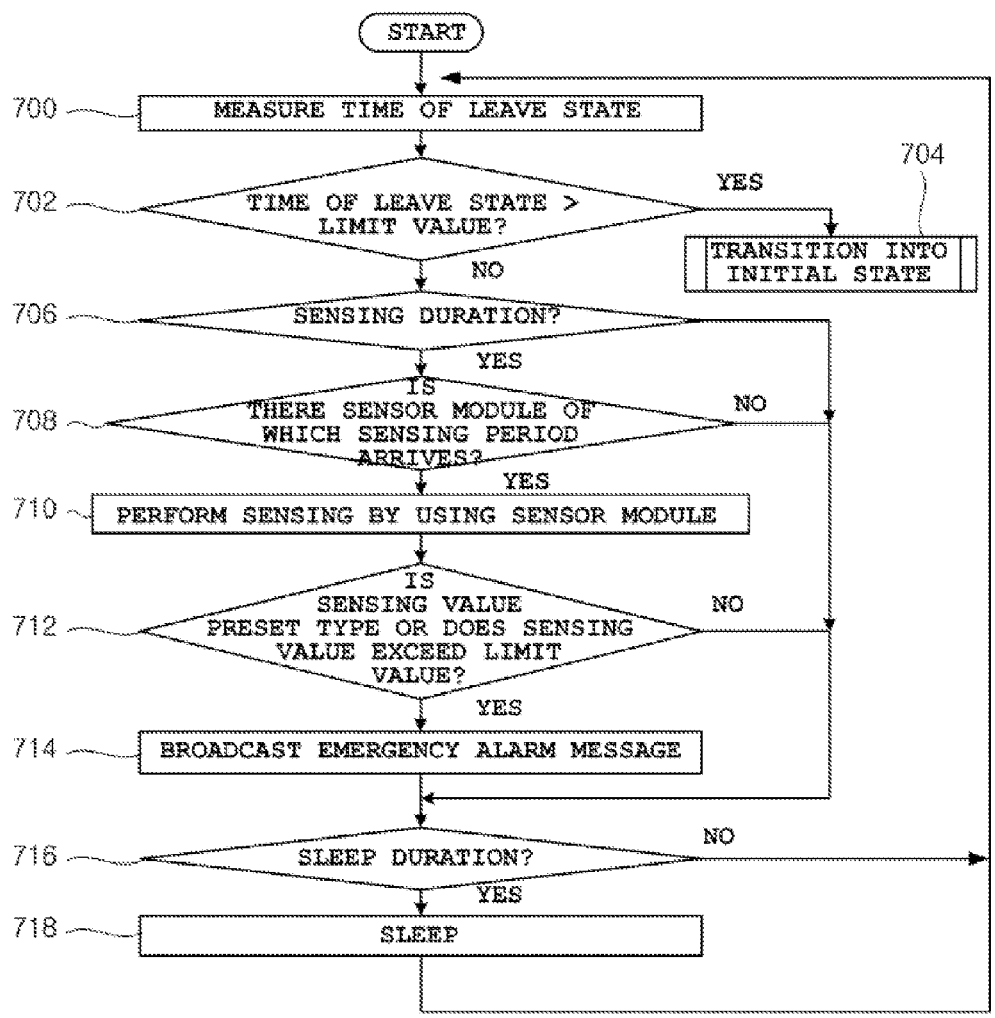

As described above, operations of the terminal node device will be described in detail with reference to FIGS. 8 to 10.

<Initial State>

First, the initial state among the above-described operating states of the terminal node device will be described with reference to FIG. 8.

If a request for time synchronization is issued (Step 500), the terminal node device checks whether or not a beacon message is received during a preset beacon message scan time (Step 502).

If the beacon message is received, the terminal node device performs time synchronization according to the beacon message and transitions into the synchronous state. By the time synchronization, the receiving duration, the transmitting duration, the sensing duration, and the first and second sleep durations are determined (Step 504). In addition, if the beacon message includes an emergency alarm message, the terminal node device processes the emergency alarm message to output emergency alarm.

On the other hand, if an emergency alarm message is received from another terminal node device during the beacon message scan time, the terminal node device processes the emergency alarm message to output emergency alarm.

On the other hand, if any beacon message is not received during the beacon message scan time (Step 504), the terminal node device transitions into the leave state (Step 508).

<Synchronous State>

Next, the synchronous state among the above-described operating states of the terminal node device will be described with reference to FIG. 9.

The terminal node device checks whether or not a preset receiving duration arrives (Step 600).

If the preset receiving duration arrives, the terminal node device checks whether or not a beacon message is received (Step 602).

If the beacon message is not received, the terminal node device transitions into the leave state (Step 604).

If the beacon message is received, the terminal node device performs time synchronization and sleep during the first sleep duration (Step 606). The first sleep duration is a sleep duration between the receiving duration and the transmitting duration. Herein, if the received beacon message includes an emergency alarm message, the terminal node device processes the emergency alarm message to output emergency alarm.

Next, the terminal node device checks whether or not the first sleep duration ends and the transmitting duration arrives (Step 608).

If the preset transmitting duration arrives, the terminal node device is switched to a transmission mode to receive a preemptive message from a terminal node device in the surroundings (Step 609). Herein, the preemptive message is a sensing message transmitted by the terminal node device in the surroundings.

As described above, while maintaining the reception state of the preemptive message, the terminal node device checks whether or not the time slot selected corresponding to the priority level applied to the sensing data stored in the internal memory unit of the terminal node device itself and the node address information arrives (Step 610). If the time slot selected corresponding to the priority level applied to the sensing data stored in the internal memory unit of the terminal node device itself and the node address information arrives, the terminal node device checks whether or not a preemptive message of another terminal node device is received (Step 611). If the preemptive message of another terminal node device is received, the terminal node device determines that another terminal node device already acquires priority and transmits a sensing message (preemptive message), and the terminal node device proceeds to Step 616.

On the other hand, if a preemptive message is not received, the control unit of the terminal node device generates a sensing message including the sensing data stored in the internal memory unit and the node identification information, the sensing time information, and the like of the terminal node device itself and transmits the sensing message to the sink node device (Step 612). Herein, the sensing message of the terminal node device itself serves as a preemptive message for another terminal node device.

As described above, after transmitting the sensing message, the terminal node device waits until the sink node device returns an ACK message with respect to the sensing message transmitted by the terminal node device itself (Step 614). If the sink node device returns an ACK message with respect to the sensing message transmitted by the terminal node device itself, the terminal node device maintains the sleep state during a preset second sleep duration (Step 622). Herein, the second sleep duration is a sleep duration between the transmitting duration and the sensing duration.

On the other hand, if the sink node device does not return an ACK message, or if a preemptive message is received before the time slot selected corresponding to the priority level applied to the sensing data stored in the internal memory unit of the terminal node device itself and the node address information, the count value of failure times is increased (Step 616).

If the count value of failure times exceeds a preset limit value (Step 618), the terminal node device raises up the priority level of the sensing data (Step 622) and maintains the sleep state during the second sleep duration (Step 622).

The terminal node device checks whether or not the second sleep duration elapses and the sensing duration arrives (Step 624). If the sensing duration arrives, the terminal node device checks whether or not there is a sensor module of which sensing period arrives among the sensor modules included in the terminal node device itself (Step 626).

If there is a sensor module of which sensing period arrives, the terminal node device performs sensing by using the sensor module of which sensing period arrives and stores sensing data including the sensing value in the internal memory (Step 628).

Next, the terminal node device allocates a predetermined priority level to the sensing data according to a type or magnitude of the sensing value and stores the priority level (Step 630).

<Leave State>

Next, the leave state among the above-described operating states of the terminal node device will be described with reference to FIG. 10.

After transitioning into the leave state, the terminal node device performs counting of the leave state (Step 700).

The terminal node device checks whether or not the count value of the leave state exceeds a preset limit value (Step 702).

If the count value of the leave state exceeds the preset limit value, the terminal node device transitions into the initial state to scan the beacon message in order to attempt time synchronization (Step 704). If an emergency alarm message broadcasted by another terminal node device is received during the reception mode which is maintained for the scan of the beacon message, the terminal node device processes the emergency alarm message to output emergency alarm.

On the other hand, if the count value of the leave state does not exceed the preset limit value, the terminal node device checks whether or not a preset sensing duration arrives (Step 706).

If the preset sensing duration arrives, the terminal node device checks whether or not there is a sensor module of which sensing period arrives among the sensor modules included in the terminal node device itself (Step 708).

If there is a sensor module of which sensing period arrives, the terminal node device senses the surrounding environments or the like by using the sensor module of which sensing period arrives (Step 710). The terminal node device checks whether or not the sensing data according to the sensing is a preset type, for example, fire, and checks whether or not the sensing value according to the sensing exceeds a preset limit value of emergency alarm (Step 712).

If the sensing data is the preset type, or if the sensing value according to the sensing exceeds the preset limit value of emergency alarm, the terminal node device outputs emergency alarm and generates an emergency alarm message to broadcast the emergency alarm message (Step 714). Herein, a transmission time of the emergency alarm message is a time interval which is set to be longer than one communication cycle.

In addition, the terminal node device checks whether or not a preset sleep duration arrives (Step 716). If the preset sleep duration arrives, the terminal node device maintains the sleep state during sleep duration (Step 718).

What is claimed is:

1. A terminal node device communicatable with an external sink node device and another terminal node device, comprising:
    a communication module which communicates with the external sink node device and another terminal node device;
    sensor modules; and
    a control unit which controls the terminal node device so as to transition from an initial state into one of a synchronous state and a leave state and allows the terminal node device to be operated while transitioning into one of the initial state, the synchronous state, and the leave state,
    wherein in the case of the initial state, the control unit scans a message received from an external portion by using the communication module; if a beacon message is received from a sink node device, the control unit transitions into the synchronous state; and if a beacon message is not received from the sink node device for a predetermined time, the control unit transitions into the leave state,
    wherein in the case of the synchronous state, if a beacon message is received from the sink node device by using the communication module, the control unit synchronizes the terminal node device with the sink node device according to the beacon message received from the sink node device, performs sensing by using the sensor module, generates a sensing message including the sensed information, and transmits the sensing message to the sink node device by using the communication module; and if a beacon message is not received from the sink node device for a predetermined time, the control unit transitions into the leave state, wherein in the case of the leave state, the control unit performs sensing by using the sensor module and broadcasts a sensing message including the sensed information; and if the leave state has been maintained for a preset time, the control unit transitions into the initial state, wherein in the case of the leave state, the control unit allows one frame for message communication to include a transmitting duration, a sensing duration, and a sleep duration, and wherein the transmitting duration is a duration where a sensing message is broadcasted by using the communication module, the sensing duration is a duration where sensing is performed by using the sensor module, and the sleep duration is a duration excluding the transmitting duration and the sensing duration.

2. The terminal node device according to claim 1, wherein in the case of the synchronous state, the control unit allows one frame duration for message communication to include a receiving duration, a transmitting duration, a sensing duration, and a sleep duration, wherein the receiving duration is a duration where a beacon message is received from the sink node device, the transmitting duration is a duration where a sensing message is transmitted to the sink node device, the sensing duration is a duration where sensing is performed by using the sensor module, and the sleep duration is a duration excluding the receiving duration, the transmitting duration, and the sensing duration, and wherein the control unit allows the terminal node device and the sink node device to be synchronized in time with each other according to the beacon message received from the sink node device so that the receiving duration is set to correspond to the transmitting duration of the sink node device and the transmitting duration is set to correspond to the receiving duration of the sink node device.

3. The terminal node device according to claim 1, wherein the terminal node device further includes an internal memory, wherein in the case of the synchronous state or the leave state, the control unit performs sensing by using one or two or more among the sensor modules and stores sensing data including sensed information in the internal memory, and wherein the sensed information includes a type of the sensor and a sensing value.

4. The terminal node device according to claim 1, wherein the terminal node device further includes an output unit which outputs emergency alarm, wherein in the case of the synchronous state or the leave state, if a sensing value of the sensing message exceeds a preset limit range of the sensor module, the control unit outputs the emergency alarm though the output unit and, at the same time, generates an emergency alarm message to broadcast the emergency alarm message, and wherein if the emergency alarm message is received through the communication module, the control unit outputs emergency alarm through the output unit.

5. The terminal node device according to claim 2, wherein the control unit divides the transmitting duration into a plurality of time slots and selects one of the divided time slots, wherein the control unit switches the transmitting duration to a reception mode until the selected time slot arrives, and wherein if a sensing message is not received from another terminal node device until the selected time slot arrives, the control unit transmits the sensing message to the sink node device and another terminal node device through the selected time slot.

6. The terminal node device according to claim 5, wherein the control unit allocates a predetermined priority level to the sensing message according to a type of the sensor and a size of the sensing value included in the sensing message, and wherein the control unit selects one of the divided time slots of the transmitting duration according to the priority level or according to the priority level and node address of the terminal node device.

7. The terminal node device according to claim 5, wherein if a sensing message is received from another terminal node device before the selected time slot arrives, or if an ACK message with respect to the sensing message which the terminal node device itself transmits to the sink node device is not returns from the sink node device, the control unit raises up the priority level of the sensing message.

8. The terminal node device according to claim 1, wherein the terminal node device further includes an internal memory, wherein the internal memory stores a sensing period of each of the sensor modules, and the sensing period is defined as a multiple number of a period of the sensing duration, and wherein the sensing duration in the synchronous state or the leave state arrives, the control unit checks whether or not there is a sensor module of which sensing period arrives among the sensor modules, and if there is a sensor module of which sensing period arrives, the control unit drives the sensor module to perform sensing.

9. The terminal node device according to claim 1, wherein the terminal node device further includes a plurality of power supply outlets which receive commercial power as an input and outputs the commercial power, and wherein the sensor modules includes at least one or more of a CO sensor, a temperature sensor, a smoke sensor, an overcurrent sensor for the power supply outlet, a power detection unit for the power supply outlet, and a voltage detection unit for the power supply outlet.

10. A wireless sensor network system comprising:

a sink node device; and a plurality of terminal node devices, wherein the sink node device transmits a beacon message to the terminal node devices, wherein each of the terminal node devices includes:

a communication module which communicates with the external sink node device and another terminal node device;

sensor modules; and a control unit which controls the terminal node device so as to transition from an initial state into one of a synchronous state and a leave state and allows the terminal node device to be operated while transitioning into one of the initial state, the synchronous state, and the leave state, wherein in the case of the initial state, the control unit scans a message received from an external portion by using the communication module; if a beacon message is received from a sink node device, the control unit transitions into the synchronous state; and if a beacon message is not received from the sink node device for a predetermined time, the control unit transitions into the leave state, wherein in the case of the synchronous state, if a beacon message is received from the sink node device by using the communication module, the control unit synchronizes the terminal node device with the sink node device according to the beacon message received from the sink node device, performs sensing by using the sensor module, generates a sensing message including the sensed information, and transmits the sensing message to the sink node device by using the communication module; and if a beacon message is not received from the sink node device for a predetermined time, the control unit transitions into the leave state, wherein in the case of the leave state, the control unit performs sensing by using the sensor module and broadcasts a sensing message including the sensed information; and if the leave state has been maintained for a preset time, the control unit transitions into the initial state, wherein in the case of the synchronous state, the control unit of each of the terminal node device allows one frame duration for message communication to include a receiving duration, a transmitting duration, a sensing duration, and a sleep duration, wherein the receiving duration is a duration where a beacon message is received from the sink node device, the transmitting duration is a duration where a sensing message is transmitted to the sink node device, the sensing duration is a duration where sensing is performed by using the sensor module, and the sleep duration is a duration excluding the receiving duration, the transmitting duration, and the sensing duration, and wherein the control unit allows the terminal node device and the sink node device to be synchronized in time with each other according to the beacon message received from the sink node device so that the receiving duration of the terminal node device is set to correspond to the transmitting duration of the sink node device and the transmitting duration of the terminal node device is set to correspond to the receiving duration of the sink node device.

11. The wireless sensor network system according to claim 10, wherein the sink node device includes:
a communication module which communicates with the terminal node devices and an external server;
sensor modules; and
a control unit which generates a beacon message to transmit the beacon message to the terminal node devices, transmits a sensing message to the external server if the sensing message is received from the terminal node devices, performs sensing by using the sensor module, and generates a sensing message including the sensed information to transmit the generated sensing message to the external server.

12. The wireless sensor network system according to claim 10,
wherein the terminal node device further includes an internal memory,
wherein in the case of the synchronous state or the leave state, the control unit performs sensing by using one or two or more among the sensor modules and stores sensing data including sensed information in the internal memory, and
wherein the sensed information includes a type of the sensor and a sensing value.

13. The wireless sensor network system according to claim 10, wherein the terminal node device further includes an output unit which outputs emergency alarm, wherein in the case of the synchronous state or the leave state, if a sensing value of the sensing message exceeds a preset limit range of the sensor module, the control unit outputs the emergency alarm though the output unit and, at the same time, generates an emergency alarm message to broadcast the emergency alarm message, and wherein if the emergency alarm message is received through the communication module, the control unit outputs emergency alarm through the output unit.

14. The wireless sensor network system according to claim 11,
wherein the control unit of each of the terminal node devices divides the transmitting duration into a plurality of time slots and selects one of the divided time slots,
wherein the control unit switches the transmitting duration to a reception mode until the selected time slot arrives, and
wherein if a sensing message is not received from another terminal node device until the selected time slot arrives, the control unit transmits the sensing message to the sink node device and another terminal node device through the selected time slot.

15. The wireless sensor network system according to claim 10, wherein the terminal node device further includes a plurality of power supply outlets which receive commercial power as an input and output the commercial power, and
wherein the sensor modules includes at least one or more of a CO sensor, a temperature sensor, a smoke sensor, an overcurrent sensor for the power supply outlet, a power detection unit for the power supply outlet, and a voltage detection unit for the power supply outlet.

16. A terminal node device communicatable with an external sink node device and another terminal node device, comprising:
a communication module which communicates with the external sink node device and another terminal node device;
sensor modules; and
a control unit which controls the terminal node device so as to transition from an initial state into one of a synchronous state and a leave state and allows the terminal node device to be operated while transitioning into one of the initial state, the synchronous state, and the leave state,
wherein in the case of the initial state, the control unit scans a message received from an external portion by using the communication module; if a beacon message is received from a sink node device, the control unit transitions into the synchronous state; and if a beacon message is not received from the sink node device for a predetermined time, the control unit transitions into the leave state,
wherein in the case of the synchronous state, if a beacon message is received from the sink node device by using the communication module, the control unit synchronizes the terminal node device with the sink node device according to the beacon message received from the sink node device, performs sensing by using the sensor module, generates a sensing message including the sensed information, and transmits the sensing message to the sink node device by using the communication module; and if a beacon message is not received from the sink node device for a predetermined time, the control unit transitions into the leave state,
wherein in the case of the leave state, the control unit performs sensing by using the sensor module and broadcasts a sensing message including the sensed information; and if the leave state has been maintained for a preset time, the control unit transitions into the initial state wherein the terminal node device further includes an output unit which outputs emergency alarm, wherein in the case of the synchronous state or the leave state, if a sensing value of the sensing message exceeds a preset limit range of the sensor module, the control unit outputs the emergency alarm though the output unit and, at the same time, generates an emergency alarm message to broadcast the emergency alarm message, and wherein if the emergency alarm message is received through the communication module, the control unit outputs emergency alarm through the output unit.

* * * * *